March 31, 1964  E. P. CORBIN  3,126,997
CONVEYOR BELT SUPPORTING STRUCTURE
Filed May 20, 1960  2 Sheets-Sheet 1

INVENTOR;
EBER P. CORBIN,
BY David Young
ATT'Y.

March 31, 1964  E. P. CORBIN  3,126,997
CONVEYOR BELT SUPPORTING STRUCTURE
Filed May 20, 1960  2 Sheets-Sheet 2

INVENTOR;
EBER P. CORBIN,
BY David Young
ATT'Y.

United States Patent Office 3,126,997
Patented Mar. 31, 1964

3,126,997
CONVEYOR BELT SUPPORTING STRUCTURE
Eber P. Corbin, Upper Arlington, Ohio, assignor, by mesne assignments, to Jeffrey Galion Manufacturing Company, a corporation of Ohio
Filed May 20, 1960, Ser. No. 30,584
1 Claim. (Cl. 198—184)

The instant invention relates to a conveyor belt supporting structure, and more particularly to a belt supporting structure which includes belt supporting idlers and yieldable, suspended ropes to which the idlers are secured for yieldably supporting the idlers in the structure.

It is a prime object of the instant invention to provide an improved conveyor belt supporting structure including a yieldably supported idler assembly for the conveyor belt.

It is a further object of the instant invention to provide an improved conveyor belt supporting structure including a pair of ropes at each side of the belt, disposed one above the other at the opposite sides of the belt, and to which there is secured an idler assembly to be yieldably supported by the ropes.

It is another object of the instant invention to provide an improved end section for a belt conveyor which includes a frame to which there is secured a pair of ropes at each side thereof, the individual ropes of each pair of ropes being disposed one above the other and yieldably supporting an idler assembly for the conveyor belt.

It is also an object of the instant invention to provide an end section for a belt conveyor forming a loading station for the conveyor, and including impact idler assemblies yieldably supported in the end section on ropes disposed one above the other at opposite sides of the end section.

It is still another object of the instant invention to provide a loading station for a belt conveyor comprising an impact idler assembly, and a pair of ropes at each side of the loading station disposed one above the other with the impact idler assembly being secured to the ropes and yieldably supported thereby.

Other objects of the instant invention will appear hereinafter, the novel features and combinations being set forth in the appended claim.

In the accompanying drawings:

FIG. 3 is a vertical sectional view taken on the line 3—3 in FIG. 1; and

FIG. 4 is a partial elevational view of an idler assembly showing the brackets for securing the idler assembly to the ropes.

Figure 1:
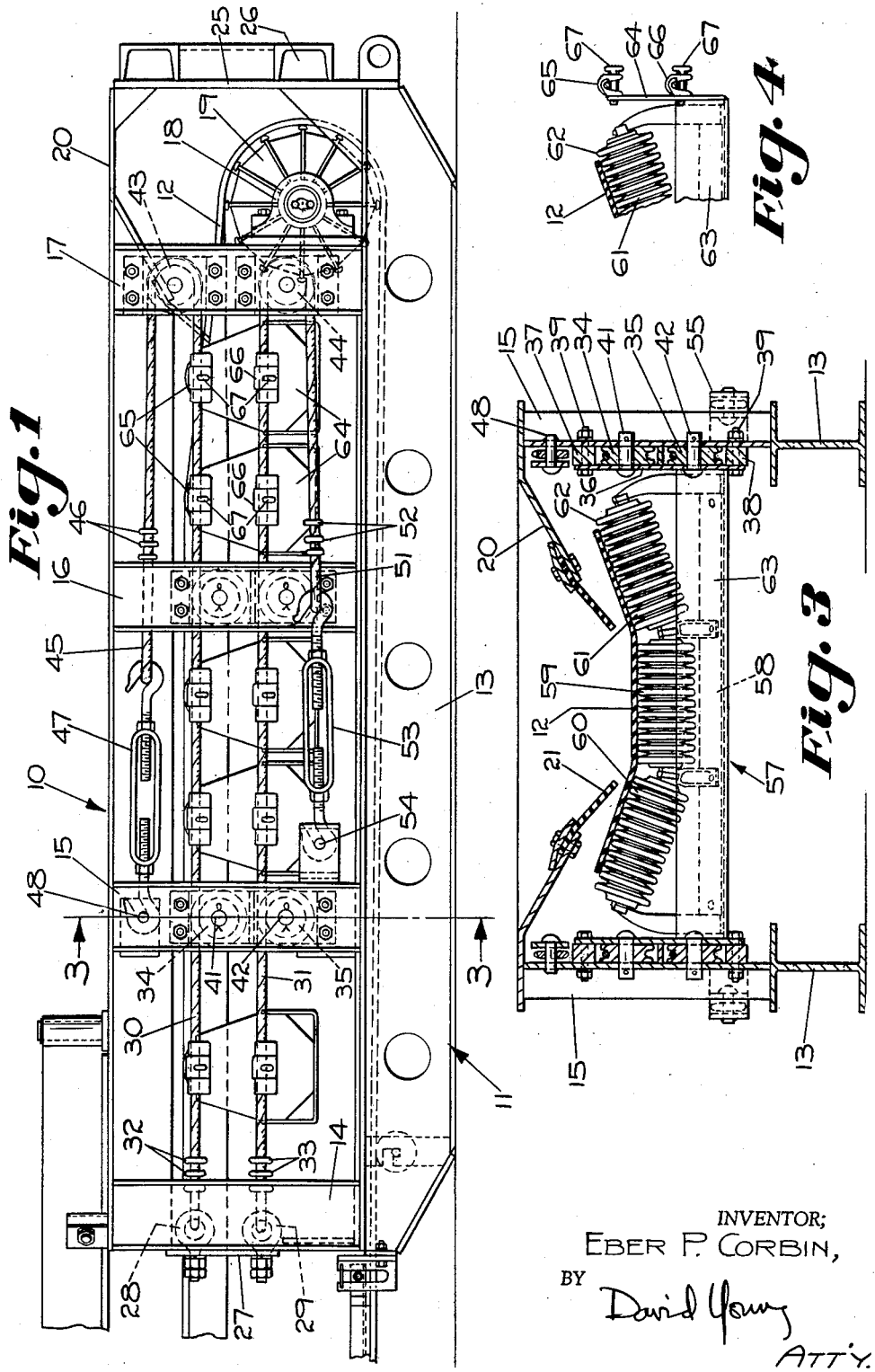
FIG. 1 is a side elevational view of an endless belt conveyor end section constructed in accordance with the instant invention.
Figure 2:
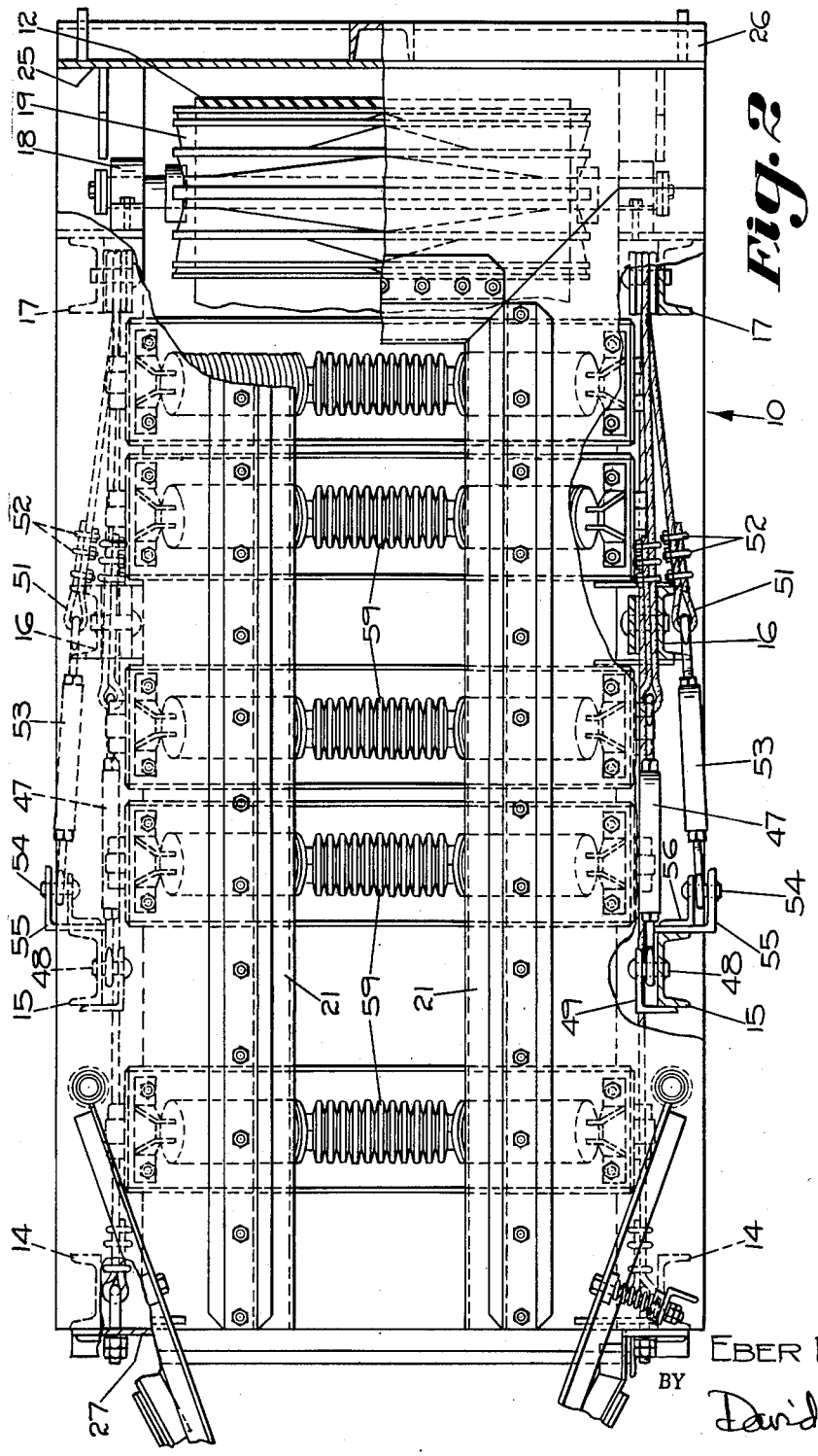
FIG. 2 is a top plan view of the endless belt conveyor end section.

Referring to the drawings, there is illustrated therein an endless belt conveyor end section 10 embodying the instant invention and comprising an elongated frame 11 which extends in the direction of the endless conveyor belt 12. The frame includes a pair of longitudinally extending skids 13 disposed one at each side of the frame 11 or supporting the latter on the ground. Each of the skids 13 may be formed of an I-section beam. A plurality of upright columns 14, 15, 16, 17 are secured to the top of each skid 13, and are disposed at equidistantly spaced positions along the length of the respective skids 13. The upright columns 17 nearest the outer end of the conveyor end section 10 each has a suitable bearing 18 secured thereto. The bearings 18 rotatably support a self-cleaning end pulley 19, which may be of any suitable type, for supporting and guiding the endless conveyor belt 12 at the end of the conveyor.

A hopper 20 extends along a portion of the conveyor belt 12 and is supported on the tops of the upright columns 14, 15, 16, 17 and is secured thereto, as by welding. The hopper 20 may be formed of plate members joined to each other, as by welding, and is open at its inner end near the upright columns 14 to permit the conveyor belt 12 to carry materials past the open end of the hopper 20, and away from the conveyor end section 10. The hopper 20 further includes flexible lips 21, which extend inwardly from the lower edges of the hopper 20, and are directed downwardly towards the conveyor belt 12 to assist in directing the loading of materials onto the conveyor belt 12 and to prevent the loss of materials during loading.

At the outer end of the end section 10 the hopper 20 extends over the end pulley 19 to provide a top cover therefor. The outer end of the end section 10 is closed by an end wall 25, which is secured to the ends of the skids 13, as by welding, and extends upwardly therefrom to the hopper 20 to which the end wall 25 is also secured, as by welding. The end wall 25 is reinforced by a plurality of channel members 26, which may be arranged in a substantially I-configuration, as illustrated in the drawings, and secured to the outer surface of the end wall 25, as by welding.

An anchor plate 27 is secured to each upright column 14, as by welding, and the anchor plates 27 extend inwardly towards each other from the respective upright columns 14. A pair of eye-bolts 28, 29 are secured to each anchor plate 27, and are disposed one above the other in substantially upright alignment. Wire ropes 30, 31 are looped through the eye-bolts 28, 29, respectively, and the ends of the wire ropes 30, 31 are secured by suitable rope clamps 32, 33, respectively, whereby the wire ropes 30, 31 at each side of the conveyor end section 10 are anchored or secured to the upright columns 14 at the opposite sides of the conveyor end section 10.

Each of the upright columns 15, 16 includes a pair of sheaves 34, 35, which are rotatably mounted on the upright columns 15, 16 and on each of the upright columns 15, 16 the sheaves 34, 35 are disposed one above the other in upright alignment. At the inner side of each upright column 15, 16 there is a plate 36, which is disposed substantially parallel to its upright column 15, 16 and is spaced therefrom by upper and lower spaced blocks 37, 38. The plates 36 are secured to the respective upright columns 15, 16 in spaced disposition relatively thereto by a plurality of bolts 39 extending through the plates 36 and the spacer blocks 37, 38. There is thus formed a box-like structure at the inner side of each of the upright columns 15, 16 for receiving the sheaves 34, 35 therein. The sheaves 34, 35 are rotatably mounted on pins 41, 42, respectively, which extend through the plates 36 and the respective upright columns 15, 16.

The upright columns 17 at the outer end of the conveyor end section 10 each supports a pair of upper and lower sheaves 43, 44, respectively, which are rotatably mounted on an upright column 17 in a box-like structure that is constructed similarly to the sheave supporting structure previously described in connection with the upright columns 15, 16. The upper sheave 43 is disposed with its axis above the axis of the sheaves 34, but having the rope engaging surfaces of the respective sheaves 34, 43 disposed in alignment for extending the wire rope 30 over the sheaves 34 and around the sheave 43. The lower sheaves 44 on the upright columns 17 are each disposed in longitudinal alignment with the lower sheaves 35 on the upright columns 15, 16, for extending the wire rope 31 over the sheaves 35 and around the sheave 44.

The upper wire ropes 30 at the opposite sides of the conveyor end section 10 each extends from an eye-bolt 28 along the conveyor end section 10 towards the outer end thereof, over the sheaves 34 which are disposed in underlying engagement with the wire ropes 30 to provide auxiliary support therefor. The wire ropes 30 are each wound around a sheave 43 to reverse the direction of the wire ropes 30. The end of each wire rope 30 is formed with a loop 45 which is secured by suitable rope clamps 46. The loop 45 is hooked over one end of a turnbuckle 47, and the other end of the turnbuckle is connected to a pin 48, which is secured to an upright column 15, the pin 48 being supported by an angle element 49 and the upright column 15. The angle element 49 is secured to the upright column 15, as by welding, and has one leg thereof disposed at the inner side of the upright column 15 and spaced therefrom, with the pin 48 extending through the angle element 49 and the upright column 15, and the turnbuckle 47 being connected to the pin 48 between the angle element 49 and the upright column 15. The turnbuckle 47 may be adjusted in the usual manner to apply tension to the wire rope 30, thereby the wire rope 30 is suspended under tension on the frame 11 of the conveyor end section 10, between the several upright columns 14, 15, 16, 17.

The lower wire rope 31 at each side of the conveyor end section 10 extends from the eye-bolt 29 towards the outer end of the conveyor end section 10 over the lower sheaves 35 on the upright columns 15, 16 and around the sheave 44 on the upright column 17 to reverse the direction of the wire rope 31. The end of the wire rope 31 is formed with a loop 51 that is secured by a plurality of suitable rope clamps 52. The loop 51 is hooked over one end of the turnbuckle 53, and the other end of the turnbuckle 53 is secured to a pin 54, which is supported by angle elements 55, 56 secured to each other and to an upright column 15, as by welding. Each of the angle elements 55, 56 has a leg thereof spaced from each other, with the pin 54 extending through the spaced legs of the angle elements 55, 56, and the turnbuckle 53 being engaged wtih the pin 54 between the spaced legs of the angle elements 55, 56. The turnbuckle 53 may be turned up in the usual manner to place the wire rope 31 under tension and to suspend the wire rope 31 under tension on the frame 11 of the conveyor end section 10 between the upright columns 14, 15, 16, 17.

The upper and lower wire ropes 30, 31 are disposed at opposite sides of the conveyor end section 10 one above the other in upright alignment, at positions outwardly of the endless conveyor belt 12. A plurality of impact troughing idler assemblies 57 are provided in the conveyor end section 10 for supporting and guiding the endless conveyor belt 12 through the conveyor end section 10, and these idler assemblies 57 are yieldably supported on the wire ropes 30, 31 to absorb the forces of impact of the materials being loaded onto the endless conveyor belt 12 at the conveyor end section 10, the latter forming a loading station for the conveyor.

Each impact troughing idler assembly 57 includes a roll supporting frame 58 in which there is supported a rotatable center idler roll 59 and a pair of rotatable outer idler rolls 60, 61, the latter being disposed one at each side of the center idler roll 59. The outer idler rolls 60, 61 are each disposed on an inclined axis extending upwardly and outwardly with respect to the longitudinal center line of the endless conveyor belt 12, and the center idler roll 59 is disposed on a substantial horizontal axis, whereby the several idler rolls 59, 60, 61 are placed in troughing disposition in the roll supporting frame 58 to form the endless conveyor belt 12 with a troughed configuration. Each of the idler rolls 59, 60, 61 includes a plurality of individual annular elements or wheels 62, which are assembled in abutting relationship to form the belt engaging periphery of the idler rolls 59, 60, 61. Each of the annular elements or wheels 62 is formed with a resilient body and in assembly form the idler rolls 59, 60, 61 with an impact absorbing body for resisting the forces applied to the idler rolls 59, 60, 61 by the impact of the loading of materials on the endless conveyor belt 12.

The troughing idler assemblies 57 each includes a box-like frame element 63 in which the idler roll supporting frame 58 is placed. At each end of the box-like frame element 63 there is provided an upright side plate 64 secured to the ends of the box-like frame element 63, as by welding. At the outer side of each upright side plate 64 there is provided a pair of rope engaging brackets 65, 66, which open downwardly to be placed over the wire ropes 30, 31, respectively, for attaching the troughing idler assemblies 57 to the wire ropes 30, 31 and to support the troughing idler assembly 57 thereon. A wedging pin 67 is provided for each rope engaging bracket 65, 66, and extends through the opposite legs of the latter and may be driven in to fixedly secure the wire ropes 30, 31 in the rope engaging brackets 65, 66, respectively. The troughing idler assemblies 57 are thus fixedly secured to the wire ropes 30, 31 to be yieldably supported thereby on the frame 11 of the conveyor end section 10.

The conveyor end section 10 is disclosed herein as comprising a pair of troughing idler assemblies 57 disposed between each of the upright columns 15, 16 and the upright columns 16, 17, and a single troughing idler assembly 57 is disclosed as being disposed between the upright columns 14, 15. The number of troughing idler assemblies 57 to be provided in the conveyor end section 10 and the particular disposition thereof is primarily governed by the anticipated loads which will be placed on the endless conveyor belt 12. Heavier loads on the endless conveyor belt 12 will, of course, require a greater number of impact troughing idler assemblies 57 than will lighter loadings on the endless conveyor belt 12.

In accordance with the instant invention there is provided a conveyor end section 10 which forms a loading station for the conveyor. There are provided a plurality of impact troughing idlers 57 for absorbing the forces of impact for the loadings on the endless conveyor belt 12, and these troughing idler assemblies 57 are yieldably supported on the frame 11 by wire ropes 30, 31 extending longitudinally of the frame 11 along the conveyor belt 12, these wire ropes 30, 31 being suspended on the frame 11 under tension to be yieldable in an upright direction, whereby there is provided a further force absorbing capacity for the troughing idler assemblies 57. The forces which come to bear on the troughing idler assemblies 57 during the loading of materials onto the endless conveyor belt 12 are haphazard in direction and in magnitude. By the structure of the instant invention the troughing idler assemblies 57 are maintained in an upright position even though they may yield due to the imposition of the impact forces as described. The supporting structure for the troughing idler assemblies 57, as described herein, precludes any tilting of the troughing idler assemblies 57 due to the imposition of the impact forces, which further strengthens the supporting structure and provides a greater resistance and absorption capacity of the impact forces.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

In a conveyor having a conveyor belt, a troughing idler assembly for supporting and guiding the conveying run of the conveyor belt, a pair of ropes at each side of the conveyor belt and substantially parallel thereto for supporting the idler assembly, the individual ropes of each pair of ropes being disposed one above the other, means for suspending and tensioning the ropes, the upper ropes of the respective pairs of ropes defining an upper laterally disposed plane, the lower ropes of the respective pairs of ropes defining a lower laterally disposed plane, the upper ropes and the lower ropes of the respective pairs of ropes being spaced from each other in an upright direction whereby the respective upper and lower laterally disposed planes are spaced from each other and there being an area between such upper and lower laterally disposed planes, said idler assembly being substantially disposed in the area between the pairs of ropes at each side of the conveyor belt and between the upper and lower laterally disposed planes, said idler assembly comprising a rigid frame extending transversely between the respective ropes at each side of the conveyor belt, a pair of brackets secured to said rigid frame at opposite sides thereof for engagement with the respective ropes at each side of the conveyor belt to support the idler assembly on the ropes, said ropes cooperating with the rigid frame of said idler assembly to yieldably support the idler assembly and the conveying run of the conveyor belt and to constrain the yielding movement thereof to substantially an up and down movement only, said respective ropes at each side of the conveyor belt being effectively connected to each other by the rigid frame of said idler assembly and thereby acting with substantially equal effect in yieldably supporting said idler assembly and the conveying run of the conveyor belt for up and down movement aforesaid, a center idler roll rotatably mounted on said rigid frame on a laterally disposed axis, a pair of outer idler rolls each rotatably mounted on said rigid frame, said outer idler rolls being disposed one at each side of the center idler roll on an axis which extends upwardly and outwardly from the center idler roll, said center idler roll and said outer idler rolls being thereby placed in troughing disposition to engage the conveyor belt for supporting and guiding the conveyor belt in a troughed configuration, the axis of the center idler roll and the axes of the pair of outer idler rolls being substantially disposed in the area between the respective ropes at each side of the conveyor belt and between said upper and lower laterally disposed planes, unbalanced forces due to an unevenly and haphazardly distributed loading on the conveyor belt acting on the idler rolls in the area between the upper and lower laterally disposed planes of the upper and lower ropes and any such unbalanced forces tending to twist, turn or skew the idler assemblies being opposed by oppositely acting forces in the ropes and thereby substantially maintaining the idler assembly in an upright position on the the ropes in proper supporting and guiding engagement with the conveyor belt.

References Cited in the file of this patent

UNITED STATES PATENTS

| | | |
|---|---|---|
| 2,883,035 | Erisman | Apr. 21, 1959 |
| 2,896,774 | Long et al. | July 28, 1959 |

FOREIGN PATENTS

| | | |
|---|---|---|
| 535,658 | Italy | Nov. 16, 1955 |